United States Patent
Yu et al.

(10) Patent No.: US 8,919,190 B2
(45) Date of Patent: Dec. 30, 2014

(54) TIRE PRESSURE SENSOR DEVICE

(71) Applicant: Cub Elecparts Inc., Fuxing Township, Changhua County (TW)

(72) Inventors: San-Chuan Yu, Fuxing Township, Changhua County (TW); Tsan-Nung Wang, Hemei Township, Changhua County (TW); Shih-Chieh Tseng, Changhua (TW)

(73) Assignee: Cub Elecparts Inc., Fuxing Township, Changhua County (TW)

( * ) Notice: Subject to any disclaimer, the term of this patent is extended or adjusted under 35 U.S.C. 154(b) by 114 days.

(21) Appl. No.: 13/868,895

(22) Filed: Apr. 23, 2013

(65) Prior Publication Data
US 2014/0311233 A1    Oct. 23, 2014

(51) Int. Cl.
    *G01M 17/02*       (2006.01)
    *B60C 23/02*       (2006.01)
    *B60C 23/04*       (2006.01)

(52) U.S. Cl.
    CPC .................................. *B60C 23/0493* (2013.01)
    USPC ............................................ 73/146.8; 73/146

(58) Field of Classification Search
    None
    See application file for complete search history.

(56) References Cited

U.S. PATENT DOCUMENTS

| | | | | |
|---|---|---|---|---|
| 6,055,855 | A * | 5/2000 | Straub ......................... | 73/146.8 |
| 6,557,406 | B2 * | 5/2003 | Gabelmann .................. | 73/146.5 |
| 6,591,672 | B2 * | 7/2003 | Chuang et al. .............. | 73/146.8 |
| 6,895,810 | B2 * | 5/2005 | Saheki et al. ................ | 73/146.8 |
| 7,021,133 | B1 * | 4/2006 | Hsu .............................. | 73/146.8 |
| 7,257,998 | B2 * | 8/2007 | Luce ............................ | 73/146.8 |
| 7,536,904 | B1 * | 5/2009 | Yu ................................ | 73/146.8 |
| 8,327,700 | B2 * | 12/2012 | Nagora et al. ............... | 73/146.8 |
| 8,381,580 | B2 * | 2/2013 | Chuang et al. .............. | 73/146.8 |
| 8,490,479 | B2 * | 7/2013 | Cazzanti et al. ............. | 73/146.2 |

* cited by examiner

*Primary Examiner* — Lisa Caputo
*Assistant Examiner* — Jermaine Jenkins
(74) *Attorney, Agent, or Firm* — Muncy, Geissler, Olds & Lowe, P.C.

(57) ABSTRACT

A tire pressure sensor device includes a tire pressure sensor including a housing and a mounting block defining a through portion in a coupling means thereof, and an air valve including an extension rod having a rod body rotatably inserted through the through portion and a stop block located at one end of the rod body and rotatable with the rod body between a first angular position where the stop block is kept in accurate alignment with the through portion and axially movable with the rod body through the through portion for allowing separation between the tire pressure sensor and the air valve and a second angular position where the stop block is stopped at the coupling means of the mounting block in a staggered manner relative to the through portion to prohibit separation between the tire pressure sensor and the air valve.

6 Claims, 5 Drawing Sheets

TIRE PRESSURE SENSOR DEVICE

BACKGROUND OF THE INVENTION

1. Field of the Invention

The present invention relates to tire pressure monitoring technology and more particularly, to a tire pressure sensor device, which facilitates installation.

2. Description of the Related Art

Because the air pressure of a vehicle tire s is of great concern to traffic safety, regular vehicles are commonly equipped with a tire pressure sensor device or monitoring system that provides real-time tire pressure information to the vehicle driver, avoiding traffic accidents.

A conventional tire pressure sensor device is known comprising a tire pressure sensor and an air valve. During installation, a screw bolt is mounted in a through portion of the tire pressure sensor, and then a tool is operated to drive the screw bolt into a screw hole in the air valve, fastening the tire pressure sensor and the air valve together. During fastening up the screw bolt, the user must hold the air valve with one hand to avoid rotation of the air valve with the screw bolt when the screw bolt is being driven into the screw hole in the air valve by the user's other hand by means of the tool. Thus, the assembly procedure of the aforesaid prior art tire pressure sensor device is complicated and takes much time. An improvement in this regard is necessary.

SUMMARY OF THE INVENTION

The present invention has been accomplished under the circumstances in view. It is the main object of the present invention to provide a tire pressure sensor device, which has a simple structure and facilitates mounting and dismounting.

To achieve this and other objects of the present invention, a tire pressure sensor device in accordance with the present invention comprises a tire pressure sensor and an air valve. The tire pressure sensor comprises a housing having a mounting block. The mounting block defines a first lateral side, a second lateral side opposite to the first lateral side, and a through portion between the first lateral side and the second lateral side. The first lateral side comprises a coupling means. The through portion has its one end terminating in an inlet and located in the second lateral side, and its other end terminating in an outlet and located in the first lateral side. The air valve comprises an extension rod. The extension rod comprises a rod body and a stop block. The outer diameter of the rod body is smaller than the diameter of the through portion. Further, the rod body is inserted through the inlet and outlet of the through portion. The stop block is fixedly located at one end of the rod body, and configured subject to the non-circular cross section of the through portion.

Thus, when the air valve is in the first angular position, the stop block is kept in accurate alignment with the through portion and can be moved with the rod body of the extension rod in and out of the through portion for allowing separation between the tire pressure sensor and the air valve. On the contrary, when the air valve is in the second angular position, the stop block is stopped at the coupling means in a staggered manner relative to the through portion and prohibited from being moved through the through portion, and thus, the air valve and the tire pressure sensor are positively secured together at this time.

Other advantages and features of the present invention will be fully understood by reference to the following specification in conjunction with the accompanying drawings, in which like reference signs denote like components of structure.

DETAILED DESCRIPTION OF THE INVENTION

Figure 1:
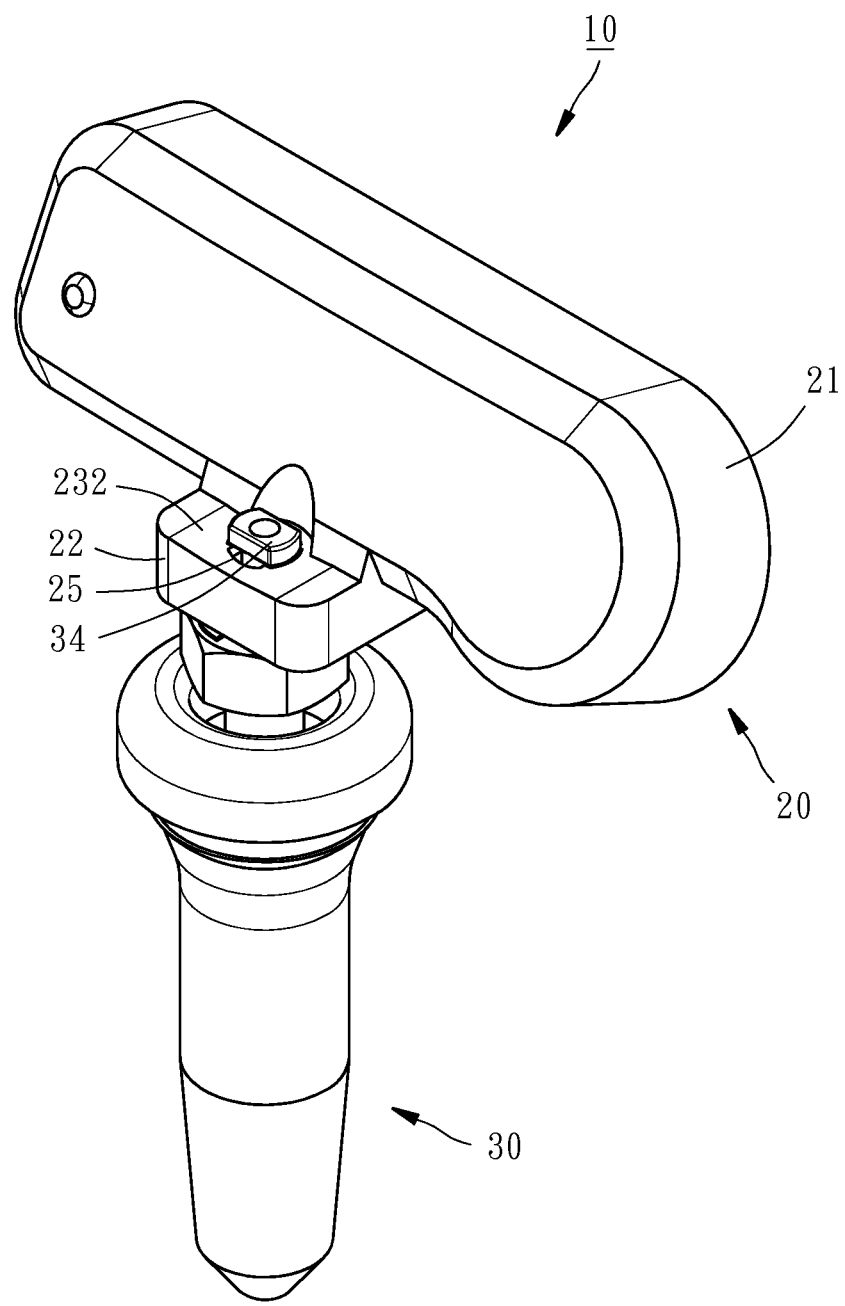
FIG. 1 is an elevational view of a tire pressure sensor device in accordance with the present invention.
Figure 2:
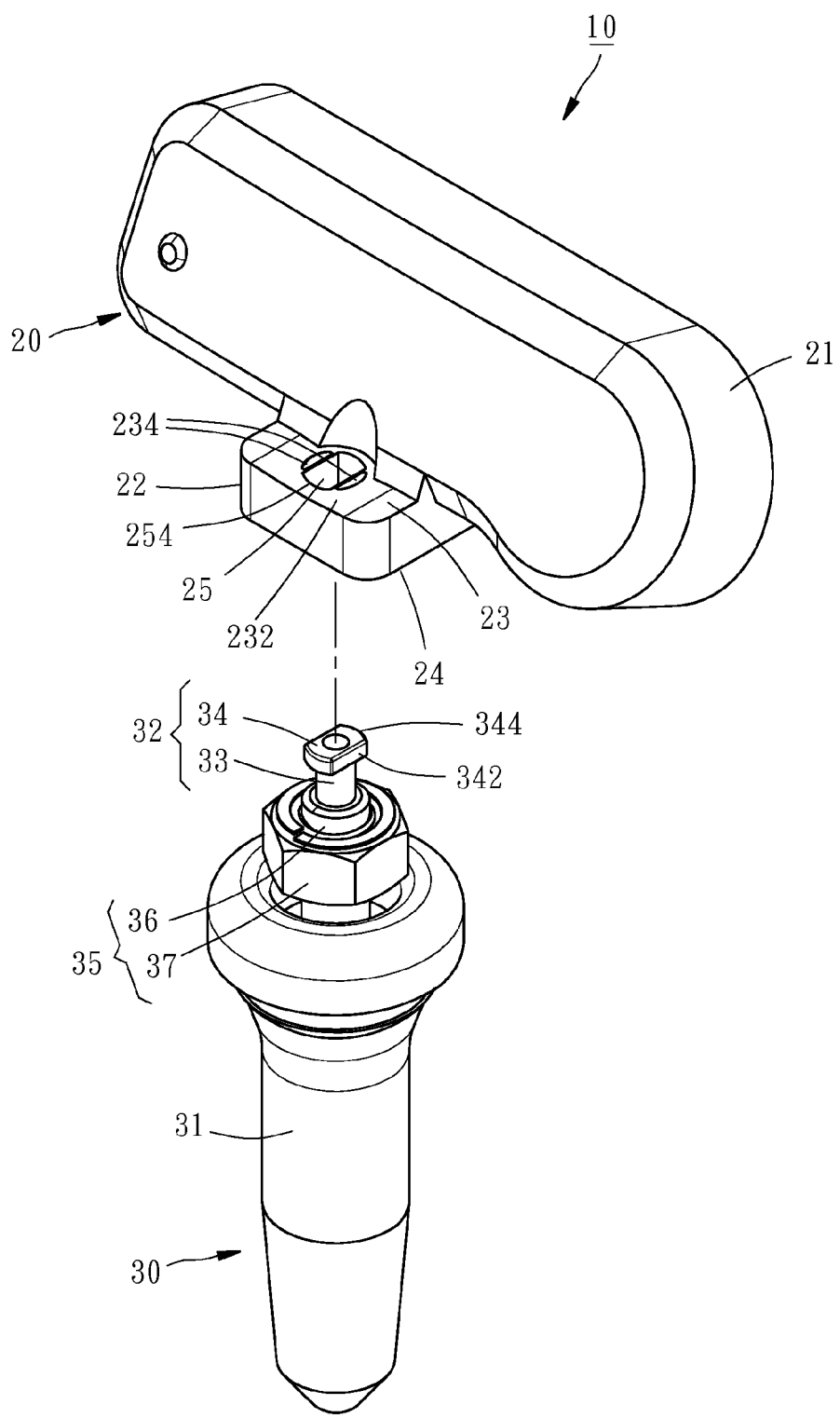
FIG. 2 is an exploded view of the tire pressure sensor device in accordance with the present invention.

Referring to FIGS. 1 and 2, a tire pressure sensor device in accordance with the present invention is shown. The tire pressure sensor device 10 comprises a tire pressure sensor 20 and an air valve 30.

The tire pressure sensor 20 comprises a housing 21, a sensor component (not shown) accommodated in the housing 21 for sensing the pressure of a tire, and a mounting block 22 formed integral with a part of the housing 21. The mounting block 22 defines a first lateral side 23, a second lateral side 24 opposite to the first lateral side 23, and a through portion 25 between the first lateral side 23 and the second lateral side 24. Further, the first lateral side 23 defines thereon a coupling means that can be a recessed portion, protruding portion, or any other configuration located on the first lateral side 23. In this embodiment, the coupling means is a recessed portion 232 having a V-shaped cross section (see FIGS. 4 and 6). The through portion 25 has its one end terminating in an inlet 252 at the second lateral side 24 (see FIG. 4), and its other end terminating in an outlet 254 at the center of the recessed portion 232 (see FIGS. 2 and 4). The mounting block 22 further defines two retaining grooves 234 that are respectively located in the recessed portion 232 at the first lateral side 23 at two opposite lateral sides of the outlet 254 of the through portion 25, as shown in FIGS. 2 and 3.

Figure 4:
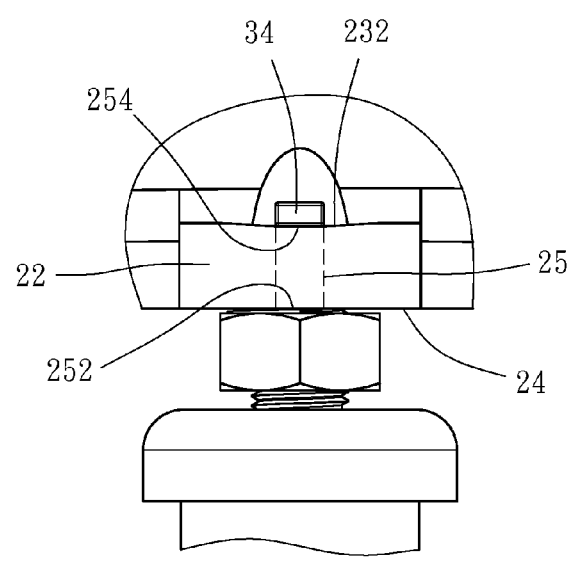
FIG. 4 is a front view of a part of the present invention, illustrating the stop block of the air valve of the tire pressure sensor device passed through the through portion of the mounting block.
Figure 5:
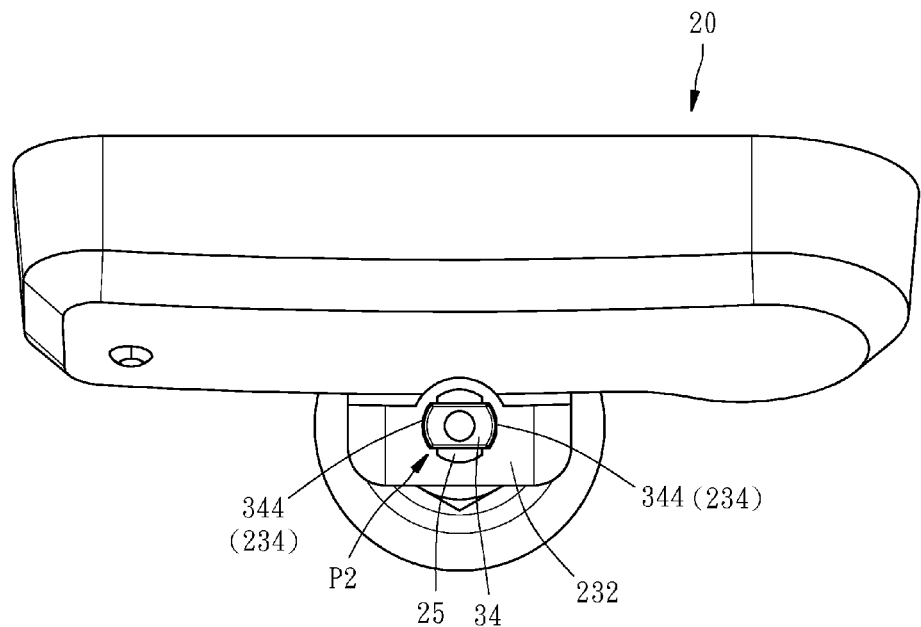
FIG. 5 is similar to FIG. 3, illustrating the air valve in the second angular position.
Figure 6:
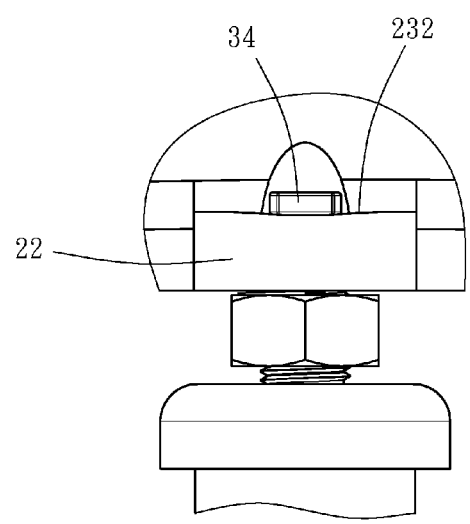
FIG. 6 is similar to FIG. 4, illustrating the stop block of the air valve stopped from movement through the through portion of the mounting block.

The air valve 30 comprises a valve body 31 and an extension rod 32. The extension rod 32 comprises a rod body 33 and a stop block 34. The rod body 33 extends out of the valve body 31 having the terminal end thereof configured for the mounting of the stop block 34. Further, the outer diameter of the rod body 33 is smaller than the diameter of the through portion 25 so that, by means of the rod body 33, the air valve 30 can be rotated relative to the tire pressure sensor 20 between a first angular position P1 (as shown in FIG. 3) and a second angular position P2 (see FIG. 5). Further, the stop block 34 is a non-circular block member configured to fit the non-circular cross section of the through portion 25, comprising two opposite planar side faces 342 and two opposite arched end faces 344. Each planar side face 243 is connected between the two arched end faces 344. Thus, when the air valve 30 is in the first angular position P1, the stop block 34 and the through portion 25 are kept in accurate alignment, allowing movement of the stop block 34 in and out of the through portion 25, as shown in FIGS. 3 and 4. On the contrary, when the air valve 30 is in the second angular position P2, the stop block 34 and the through portion 25 are vertically staggered, prohibiting the stop block 34 from being moved through the through portion 25, as shown in FIGS. 5 and 6.

Figure 3:
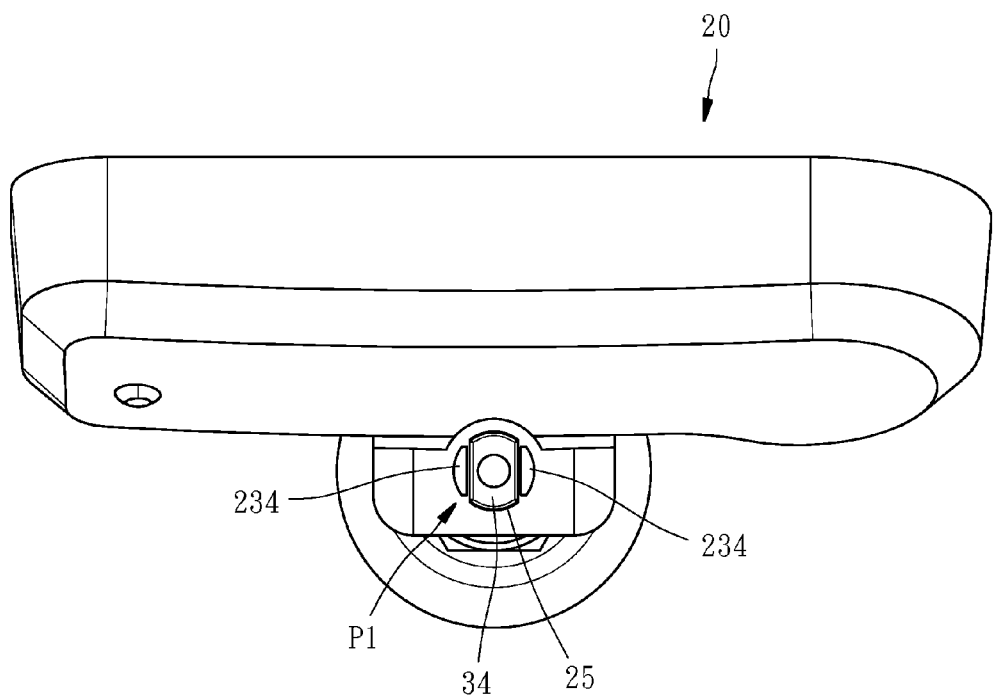
FIG. 3 is a top view of the present invention, illustrating the air valve of the tire pressure sensor device in the first angular position.

During installation, rotate the air valve 30 to the first angular position P1 to keep the stop block 34 and the through portion 5 in accurate alignment, as shown in FIG. 3, allowing movement of the stop block 34 in and out of the through portion 25. Thereafter, insert the extension rod 32 of the air valve 30 from the inlet 252 into the through portion 25 to the extend where the stop block 34 is exposed out of the outlet 254 of the through portion 25, as shown in FIGS. 3 and 4, and then rotate the air valve 30 to the second angular position P2 where the stop block 34 and the through portion 25 are vertically staggered, and the stop block 34 is prohibited from being moved through the through portion 25, as shown in FIGS. 5 and 6. At this time, the stop block 34 is abutted at the recessed portion 232 of the mounting block 22 with the arched end faces 344 respectively positioned in the retaining grooves 234 in the recessed portion 232 of the mounting block 22, and thus, the tire pressure sensor 20 and the air valve 30 are assembled.

Figure 7:
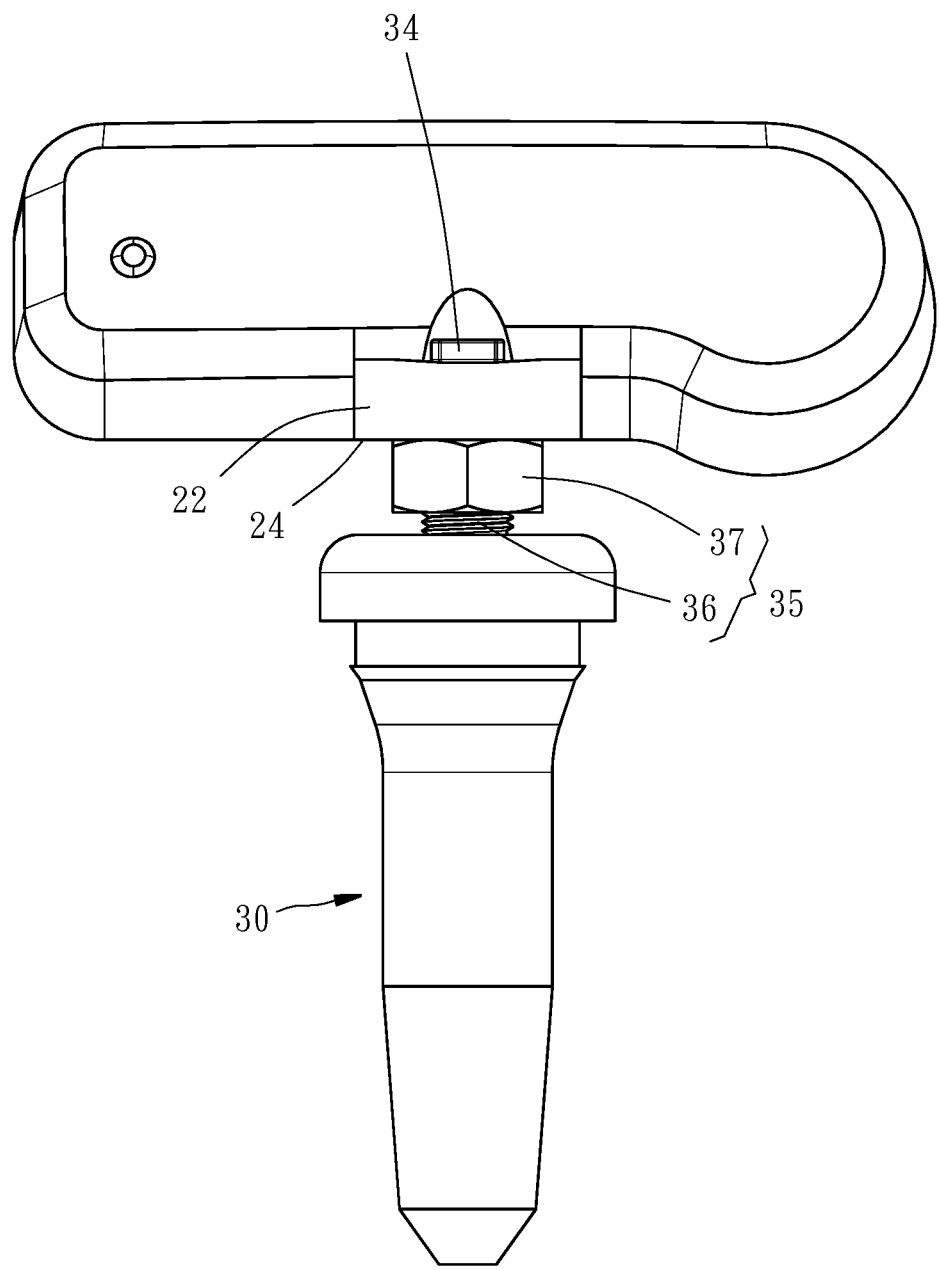
FIG. 7 is a front view of the present invention, illustrating the position of the adjustment nut of the adjustment device adjusted.

On the other hand, as shown in FIG. 7, the air valve 30 further comprises a adjustment device 35. The adjustment device 35 comprises a screw tube 36 and an adjustment nut 37. The screw tube 36 is sleeved onto the rod body 33 of extension rod 32 and fixedly connected thereto. The adjustment 37 is threaded onto the screw tube 36. Thus, the adjustment nut 37 can be rotated relative to the screw tube 36 to move along the axial direction f the screw tube 36 and to further push the second lateral side 24 of the mounting block 22 of the housing 21, enhancing the connection stability between the mounting block 22 of the tire pressure sensor 20 and the stop block 34 of the air valve 30.

In conclusion, subject to the matching design between the through portion 25 of the tire pressure sensor 20 and the stop block 34 of the air valve 30, the tire pressure sensor device 10 has the benefits of simple structure and ease of use. During operation, the user can achieve dismounting between the tire pressure sensor 20 and the air valve 30 simply by means of rotating the air valve 30. This dismounting method is faster and convenient when compared to the conventional bolted mounting technique.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A tire pressure sensor device, comprising:
a tire pressure sensor comprising a housing, said housing comprising a mounting block, said mounting block comprising a first lateral side, a second lateral side opposite to said first lateral side and a through portion disposed between said first lateral side and said second lateral side, said first lateral side comprising coupling means, said through portion comprising an inlet disposed at one end thereof and located in said second lateral side and an outlet disposed at an opposite end thereof and located in said coupling means; and
an air valve comprising an extension rod, said extension rod comprising a rod body and a stop block, said rod body having an outer diameter smaller than the diameter of said through portion, said rod body being inserted through said let and said outlet of said through portion for allowing said air valve to be rotated relative to said tire pressure sensor between said an angular position and a second angular position, said stop block being fixedly located at one end of said rod body outside said outlet of said through portion, said stop block being kept in accurate alignment with said through portion for allowing movement of said stop block in and out of said through portion through said outlet when said air valve is in said first angular position, said stop block being kept in a staggered manner relative to said through portion and prohibited from being moved through said outlet of said through portion when said air valve is in said second angular position.

2. The tire pressure sensor device as claimed in claim 1, wherein said stop block of said air valve comprises two opposite planer side faces and two opposite arched end faces, each said planar side face being connected between said arched end faces.

3. The tire pressure sensor device as claimed in claim 1, wherein said coupling means of said first lateral side of said mounting block is a recessed portion inwardly curved in said first lateral side, said recessed portion comprising two retaining grooves disposed at two opposite sides relative to said outlet of said through portion for retaining two opposite ends of said stop block.

4. The tire pressure sensor device as claimed in claim 3, wherein said recessed portion of said mounting block has a V-shaped cross section; said outlet of said through portion is disposed at the center of said coupling means.

5. The tire pressure sensor device as claimed in claim 3, wherein said air valve further comprises a adjustment device, said adjustment device comprises a screw tube and an adjustment nut, said screw tube being sleeved onto said rod body of said extension rod and fixedly connected thereto, said adjustment nut being threaded onto said screw tube and movable in an axial direction relative to said screw tube to stop against said second lateral side of said mounting block of said housing.

6. The tire pressure sensor device as claimed in claim 3, wherein said coupling means is a protruding portion protruded from said first lateral side of said mounting block.

* * * * *